(12) United States Patent
Mason

(10) Patent No.: US 7,011,800 B1
(45) Date of Patent: Mar. 14, 2006

(54) SINGLE STAGE DENITRATION

(75) Inventor: J. Bradley Mason, Pasco, WA (US)

(73) Assignee: Studsvik, Inc., Columbia, SC (US)

( * ) Notice: Subject to any disclaimer, the term of this patent is extended or adjusted under 35 U.S.C. 154(b) by 204 days.

(21) Appl. No.: 10/246,266

(22) Filed: Sep. 18, 2002

Related U.S. Application Data

(63) Continuation-in-part of application No. 10/185,616, filed on Jun. 28, 2002, which is a continuation-in-part of application No. 10/111,148, filed as application No. PCT/US00/41323 on Oct. 19, 2000.

(51) Int. Cl.
*B01J 8/18* (2006.01)
(52) U.S. Cl. .................................... 423/239.1; 423/235
(58) Field of Classification Search ................ 423/235, 423/239.1
See application file for complete search history.

(56) References Cited

U.S. PATENT DOCUMENTS

| | | | |
|---|---|---|---|
| 3,907,674 A | 9/1975 | Roberts et al. | |
| 4,154,643 A | 5/1979 | Cook et al. | |
| 4,218,427 A | 8/1980 | Yan | |
| 4,224,289 A | 9/1980 | Covey et al. | |
| 4,226,830 A | 10/1980 | Davis | |
| 4,448,589 A | 5/1984 | Fan et al. | |
| 4,483,692 A | 11/1984 | Patel | |
| 4,609,537 A | 9/1986 | Tolpin et al. | |
| 4,656,147 A | 4/1987 | Iida et al. | |
| 4,662,081 A | 5/1987 | Greenwood | |
| 4,664,678 A | 5/1987 | Rehmat et al. | |
| 4,665,632 A | 5/1987 | Greenwood | |
| 4,668,435 A | 5/1987 | Grantham | |
| 4,692,318 A * | 9/1987 | Tolpin et al. ............ | 423/239.1 |
| 4,966,101 A | 10/1990 | Maeda et al. | |
| 4,982,027 A | 1/1991 | Korff et al. | |
| 4,993,323 A | 2/1991 | Tabery et al. | |
| 5,084,258 A | 1/1992 | Linn | |
| 5,224,334 A * | 7/1993 | Bell ........................... | 60/274 |
| 5,518,702 A * | 5/1996 | Perry ...................... | 423/239.1 |
| 5,536,896 A | 7/1996 | Hesbol et al. | |
| 5,707,592 A | 1/1998 | Someus | |
| 5,909,654 A | 6/1999 | Hesbol | |
| 6,084,147 A | 7/2000 | Mason | |
| 6,211,254 B1 | 4/2001 | Whitney | |
| 6,280,694 B1 | 8/2001 | Mason | |
| 6,281,164 B1 | 8/2001 | Demmel et al. | |
| 2003/0198584 A1 | 10/2003 | Mason | |
| 2005/0096495 A1 | 5/2005 | Mason | |

FOREIGN PATENT DOCUMENTS

| | | |
|---|---|---|
| EP | 0471278 | 2/1992 |
| GB | 2271517 | 4/1994 |
| RU | 2216396 | 11/2003 |
| ZA | 200203941 | 1/2003 |

OTHER PUBLICATIONS

Webpage—Alternative High-Level Waste Treatments at the Idaho National Engineering & Environmental Laboratory; ; http://books.nap.edu/books/030906628X/html/56/html; 2 pages ; dated Sep. 25, 2004.
Webpage Alternative High-Level Waste Treatments at the Idaho National Engineering And Environmental Laboratory; http://books.nap.edu/books/030906628X/html/56.html; 2 pages dated Sep. 25, 2004.
Cementitious Solidification of DOE's Legacy Reprocessing Waste by Darryl D. Siemer of Idaho national Engineering and Environmental Laboratory, no date.
Scott Jeffers, John F. Mullen, Austin J. Cohen & Ky Dangtran; "Control Problem Waste Feeds in Fluid Beds" May 1999, 5 pages.
Clarence J. Wall, John T. Graves and Elliott J. Roberts; "How to Burn Salty Sludges" Apr. 14, 1975, 6 pages.
Joseph A. Nenni, Richard D. Boardman "Thermal Denitration and Mineralization of Waste Constituents" 14 pages, no date.

* cited by examiner

*Primary Examiner*—Edward M. Johnson
(74) *Attorney, Agent, or Firm*—Nexsen Pruet Adams Kleemeir, LLC; Townsend M. Belser, Jr.; Sara A. Centioni

(57) ABSTRACT

A system and method using superheated steam optionally augmented by oxygen for the reduction of nitrogen oxides present for reducing nitrogen oxides present in a wide variety of organic compounds. The system includes a single reaction vessel, or optionally, multiple reaction vessels in operational communication. Reduction takes place quickly when a steam/oxygen mixture is injected into the reaction vessel or vessels. Reducing additives are metered into the reaction vessel or vessels and/or provide energy input to reduce nitrates to nitrogen. The oxygen, when used, allows for some oxidation of waste by-products and provides an additional offset for thermal requirements of operation.

90 Claims, 3 Drawing Sheets

SINGLE STAGE DENITRATION

CROSS REFERENCE TO RELATED APPLICATIONS

This application is a continuation-in-part application to U.S. patent application Ser. No. 10/185,616 filed Jun. 28, 2002, which is a continuation-in-part application to U.S. patent application Ser. No. 10/111,148 filed Apr. 19, 2002, which is the national phase application of PCT/US00/41323, filed Oct. 19, 2000, which is the PCT application of U.S. Pat. No. 6,280,694, filed Oct. 20, 1999.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates generally to a single step process for removing NOx compounds from wastes, products, compounds and wastewaters. More specifically, the invention relates to a single step process utilizing a fluidized bed contactor to remove NOx compounds from explosive, hazardous and/or radioactive materials. The present invention further relates to the conversion of alkali metals into a stable mineral form.

Nitrogen oxides and alkali metals can be commonly found in many wastes, products and compounds. Nitrogen oxides (referred to herein as "NOx") include such compounds as nitric acid, aluminum nitrate, sodium nitrate, ammonium nitrate, potassium nitrate and the like. Alkali metals include such compounds as sodium nitrate, potassium nitrate, sodium sulfates, and sodium chloride.

Traditional approaches to removing NOx include dry contact reduction processes for solid and gaseous nitrate compounds and wet absorption processes for gaseous NOx. Dry contact reduction processes may be either catalytic or non-catalytic and may be either selective or non-selective. Selective reduction processes are characterized by the selective reduction of gaseous nitrogen oxides and their consequent removal in the presence of oxygen. A common selective reduction agent for gaseous NOx is ammonia. Ammonia, however, oxidizes to form unwanted nitrogen oxide at high temperatures. Moreover, excess ammonia is itself a pollutant. Other selective reduction methods employ catalysts such as iridium. The problem with catalyst reduction is that the presence of particulates, sulfurous acid gases and other poisons reduce catalyst effectiveness and life thereby increasing costs.

Non-selective reduction processes generally involve the addition of a reducing agent to the gaseous NOx containing material, consuming all free oxygen through combustion and reducing the NOx to nitrogen by the remaining reducing agent. Catalysts are typically utilized in these processes. Reducing agents useful in these processes are both scarce and expensive.

Wet absorption processes typically require large and expensive equipment such as absorption towers. An example of a wet absorption process is the absorption of nitrogen oxides by water or alkali solution. Another shortcoming of the wet absorption process is that these methods are not economically effective where the NOx concentration in the gaseous waste stream is above 5,000 ppm.

In the nuclear industry, there is an annual production of significant amounts of wastes which are classified as radioactively contaminated salt cakes, supernates, ion exchange media, sludges and solvents. These radioactive wastes either contain nitrogen oxides or nitrogen oxides are produced as part of the treatment of these wastes. In particular, nuclear fuel reprocessing with nitric acid produces highly radioactive nitric acid and sodium nitrate waste by-products.

For solid or slurry NOx wastes and compounds a variety of processes have been tried for NOx destruction. Rotary calciner and fluid bed processors have been utilized with typical results yielding less than 90% conversion of solid nitrates to gaseous NOx and nitrogen. The gaseous NOx generally exceeded 10,000 ppm which requires addition of extensive gaseous NOx removal methods as described above. In addition, severe agglomerations occur in processors as well as the presence of flammable or explosive mixtures of nitrates and reducing agents in the processors.

Another problem associated with prior art waste processing methods involves sulfur-containing compounds. The presence of such sulfur compounds in a vitrification melter can cause a molten sulfur salt pool to accumulate on top of the molten inorganic residue (glass); this pool causes high corrosion rates for the melter equipment. The pool can also have a high electrical conductivity, which causes short-circuiting of the heating electrodes in the melter. Additionally, potentially explosive conditions can result if large quantities of water contact the molten sulfur salt pool.

Further, the presence of heavy metals in the inorganic residues can render the final waste product hazardous, thereby requiring additional processing of the residue before disposal or higher disposal costs. Also, the inorganic residue can contain soluble components that may form aqueous solutions after processing; these solutions can result in contamination of the surroundings after disposal.

A process which does not have the limitations and shortcomings of the above described prior art methods for nitrogen oxide removal from waste streams and compounds would be highly desirable.

SUMMARY OF THE INVENTION

According to its major aspects and briefly recited, the present invention is a method and apparatus for converting nitrogen oxides directly to nitrogen using a steam-reformer vessel. Nitrogen oxide-containing compounds or wastes are fed into the vessel along with a fluidizing gas composed of steam and, optionally, oxygen. Optionally, the steam can be generated from the evaporation of water from the waste feed while the fluidizing gases can be air or, preferably, an inert gas or gases. The vessel contains fluidized media, such as ceramic media, carbonaceous materials, product solids, reductants, co-reactants, and/or catalysts.

Although the present invention mainly addresses the processing of nitrogen oxides and wastes containing alkali metal compounds, the waste feed may also contain other nitrogen containing materials, such as explosives, solid rocket propellants, and fertilizers, as well as organics. Further, the waste feed can have any pH value, any concentration of alkali metals, and any concentration of nitrogen oxides.

In a first embodiment of the present invention, a single vessel containing fluidized media is utilized. Carbonaceous materials present in the reaction vessel are used as the heat source to evaporate water in the waste feed and as the principal reducing agent, or reductant. The terms reducing agent and reductant are well-understood by those skilled in the art of removing nitrogen oxides from waste feeds to mean chemicals or materials that are useful in removing oxygen from a compound. Other reducing agents that may be employed include metals and metal oxides, and gaseous reductants, such as hydrogen, ammonia, methane, and carbon monoxide. Additionally, certain additives and/or co-reactants, such as clay and lime, may be used to both achieve higher melting point solid products and to form synthetic naturally occurring minerals.

The single reaction vessel is divided into at least two, and, preferably, three zones with at least one zone operated under reducing conditions. The remaining zone or zones may be operated under either reducing or oxidizing conditions. The fluidized media, which is in solids communication, is divided into these zones through the introduction of various reducing and oxidizing agents into select areas of the reaction vessel. The terms oxidizing agent and oxidizing are well-understood by those skilled in the art of removing nitrogen oxides from waste feeds to mean chemicals or materials that are useful in adding oxygen to a compound.

In the case that the vessel includes three zones, various combinations of operating conditions may be used. In a first combination, the lowest most zone is operated under oxidizing conditions via the addition of superheated steam with oxygen that reacts with the carbon to form $CO/CO_2$ and generate heat to evaporate water content and heat nitrate compounds to reduction temperature. The middle zone is operated under strongly reducing conditions in which $NO_3$, $NO$, $N_2O$ and $NO_2$ are reduced to $N_2$. Steam reforming of carbonaceous materials in this zone forms $CO$, $H_2$ and $CH_4$ that serve as strong gaseous reducing agents. The upper zone is operated under oxidizing conditions via the addition of more oxygen that oxidizes the remaining C, CO, $CH_4$ and $H_2$ formed in the second or middle zone to form $CO_2$ and water. This process results in only trace NOx, CO and $H_2$ in off-gas from the single reaction vessel and requires little auxiliary energy to be added. The term auxiliary energy is used to describe energy that is added to the reaction vessel through means other than the reactions occurring within the reaction vessels. In a second combination, the lowest zone is operated under oxidizing conditions and the middle and upper zones are operated under strongly reducing conditions. This process results in less NOx, more CO and $H_2$ output and also requires low auxiliary energy. Auxiliary energy can be provided by electrical heaters or combustion heated surfaces external or internal to the reaction bed. In a third combination, all three zones are operated under strongly reducing conditions. This process results in less NOx, increased CO and $H_2$ and requires additional auxiliary energy. Finally, in a fourth combination, the lower and middle zones are operated under strongly reducing conditions and the upper portion is operated under oxidizing conditions. This process results in low NOx, no CO and $H_2$ output but may require auxiliary energy to be added.

In a second embodiment of the present invention, a single vessel having two separate reaction beds containing fluidized media is used. The single vessel is again divided into at least two, and, preferably, three zones with at least one zone operated under reducing conditions. The remaining zone or zones may be operated under either reducing or oxidizing conditions. Preferably, the reaction beds are vertically oriented so that the lower most bed includes the lower and, optionally, the middle zone, and the upper bed includes the upper zone. The zones are operated similarly to those of the first embodiment; however, the fluidized media bed contained in the upper zone is no longer in solids communication with the lower zone. In the case that the vessel includes three zones, various combinations of operating conditions may be used as previously described.

In a third embodiment of the present invention, plural reaction vessels, and preferably, two reaction vessels that are interconnected and that contain fluidized media are used. The vessels are dividing into at least two, and, preferably, three zones with at least one zone operated under reducing conditions. The remaining zone or zones may be operated under either reducing or oxidizing conditions. Preferably, the reaction vessels are arranged side by side and are in fluid communication. The first reaction vessel includes a first zone and, optionally, a second zone, and the second reaction vessel includes a third zone. Similar to the second embodiment, at least two of the zones are separated. Again, in the case that the vessel includes three zones, various combinations of operating conditions as previously described may be employed.

In addition to the organization and operation of the three zones, other features common to the above embodiments include product handling and off-gas handling. In particular, the process is such that the larger solid products are removed from the bottom of the reaction vessel. The undersized product that is potentially carried out of the reaction vessel through the gas stream can be recycled to the reaction vessel where it can be made to grow larger for more convenient disposal. Additionally, catalysts, reductants, and fluidized media can further be recycled to the vessel. The off-gas produced in the process may also be recycled through the use of a blower downstream of the reaction vessel.

A feature of the present invention is the use of a reaction vessel containing fluidized media. The structure of the reaction vessel is such that it is both explosion and corrosion resistant. Preferably, the reaction vessel has walls that are thick enough to withstand potential explosions. This aspect is particularly useful considering the types of reactants that are involved in the process and the potential for flammable mixture. Further, the reaction vessel includes a metal insert that provides corrosion protection to the outer vessel wall.

A further feature of the present invention is that the fluidized media can be any combination of carbonaceous materials, product solids, ceramic media, reductants, co-reactants, and catalysts. Depending on the types of nitrogen oxide containing material, the process can be optimized by using various combinations of fluidized media.

Another feature of the present invention is the use of either a reaction vessel having separate reaction zones or beds, or plural interconnected reaction vessels. Preferably, the present invention includes a lower reaction bed and an upper reaction bed within the same reaction vessel. Alternatively, the present invention can include separate reaction vessels that are in fluid communication. The lower bed, or, in the case of multiple reaction vessels, the first reaction vessel can contain high carbon content and be highly reducing for high NOx conversion and with oxygen addition also have high energy generation, whereas the upper bed or second reaction vessel, respectively, can have no carbon content and be highly oxidizing. This arrangement will optimize the destruction (via oxidation) of reforming gases such as hydrogen and carbon monoxide, as well as volatile organics. Further, fine carbons from the lower bed or, alternatively, from the first reaction vessel, can be oxidized in the upper bed or second reaction vessel, respectively.

Yet another feature of the present invention is the use of co-reactants and/or additives, such as lime, clay, magnesia, aluminum compounds, phosphate compounds, and silica compounds, to form higher melting point solid products, as well as synthetic naturally occurring minerals that are preferably water-insoluble. The formation of higher melting point compounds helps to prevent agglomeration in the reaction vessel. Further, the formation of water-insoluble minerals is advantageous because they are more easily disposed of and processed. Typically, water-soluble compounds that also contain radioactive isotopes will most likely require further stabilization prior to disposal to prevent water dissolution of the buried product into the ground water.

Still another feature of the present invention is the use of a waste feed that can contain nitrogen oxide containing wastes with organics, as well as other nitrogen containing materials such as energetics, explosives, solid rocket propellants, and fertilizers. Further, the waste feed can have any pH value, any concentration of alkali metals, and any concentration of nitrogen oxides. Accordingly, the waste feed does not need to go through extensive pre-processing before being introduced into the reaction vessel.

Another feature of the present invention is the use of catalysts such as cerium, platinum, and palladium compounds to catalyze the reduction of nitrogen oxides. These catalysts decrease the energy of activation required for the reduction of nitrogen oxides.

Still another feature of the present invention is the use of carbonaceous reductants to regenerate metal catalysts or reductants in the reaction vessel. For example, carbonaceous reductants can be used to reduce $Fe_2O_3$ and $Fe_3O_4$ to FeO and/or Fe. The Fe or FeO can then serve as a very effective reducing agent to convert NOx to nitrogen gas.

The use of certain co-reactants in the presence of sulfur and halogen gases is a further feature of the present invention. Co-reactants, such as lime, magnesia, and clay, can bind S, Cl, and F, which may come from the waste feed, into a solid product matrix. The high retention of normal acid gases as solids in the bed allows scrubber solutions to be recycled to the reaction vessel thereby eliminating secondary scrubber solution wastes.

Another feature of the present invention is the use of gaseous reductants, such as hydrogen, ammonia, methane, and carbon monoxide. The use of gaseous reductants can minimize carbon fines carryover with fine product.

Still another feature of the present invention is the generation of $H_2$ and CO in the reaction bed by steam reformation reactions between water, carbon and organics present in the reaction vessel in the reducing zone.

Yet another feature of the present invention is the use of chemical reductions in combination with the steam reforming reactions. For example, the use of Fe/FeO to reduce NOx is a form of chemical reduction. These reactions are exothermic and may reduce the need for auxiliary energy. Typical chemical reducing agents include Fe, Ni, Cu, Co, and similar metals and metal oxides.

Finally, the use of product and off-gas handling is a feature of the present invention. In particular, both product carried over to the scrubber and off-gas is recycled through the use of various filters, separators, blowers and pumps. This feature improves the overall efficiency of the process and reduces, if not eliminates, the amounts of secondary waste that is generated and must be further processed.

Other features and advantages of the present invention will be apparent to those skilled in the art from a careful reading of the Detailed Description of the Preferred Embodiments presented below and accompanied by the drawings.

DETAILED DESCRIPTION OF PREFERRED EMBODIMENTS

The present invention is an apparatus and process for converting NOx from nitrogen oxide-bearing compounds and waste product feeds. The invention also involves the conversion of alkali metals, S, Cl, and F into stable mineral form. The present apparatus and processes will be described in particular with respect to radioactive waste; however, any nitrogen oxide-containing waste or product stream can be processed in accordance with the following process and with the components of the system. The wastes that can be processed according to the present invention include not only NOx containing waste streams resulting from the decomposition of ion exchange resins, but can also include nitric acid, nitrates, nitrites, and NOx containing waste stream resulting from nuclear reprocessing, explosives and energetics, solid rocket propellants, fertilizer and gaseous off-gas streams and the like. The waste stream can further include nitrogen oxide-containing materials in the presence of organics. Organics can be volatized and destroyed in the reaction vessel by pyrolysis, steam reformation and oxidation reactions. Furthermore, the waste feed can have any pH value, any concentration of alkali metals, and any concentration of nitrogen oxides. Accordingly, the waste feed does not need to be pre-processed before being introduced into the process.

The process is based on a fluidizing bed reaction vessel using steam for fluidizing which may be operated under strongly reducing conditions or under strongly reducing conditions in combination with oxidizing conditions. Carbonaceous materials, such as sugars, charcoal, and activated carbon, that are present in the fluidizing reaction vessel are used as the heat source to evaporate water in the waste feed and as the principal reducing agent, or reductant. Other fluidizing gases, reductants and/or co-reactants may be utilized to further optimize the oxidizing or reducing conditions in the reactor. Typical other fluidizing gases include: hydrogen, oxygen (when oxidizing conditions are desired), methane, ammonia, carbon dioxide, recycled off-gasses, air, inert gases, etc. Further, the use of such co-reactants or additives as clay and lime results in higher melting point product, as well as the formation of water-insoluble minerals. Product handling and off-gas handling from the process includes the use of wet scrubbers and various filters, separators, pumps, and blowers.

Figure 1:
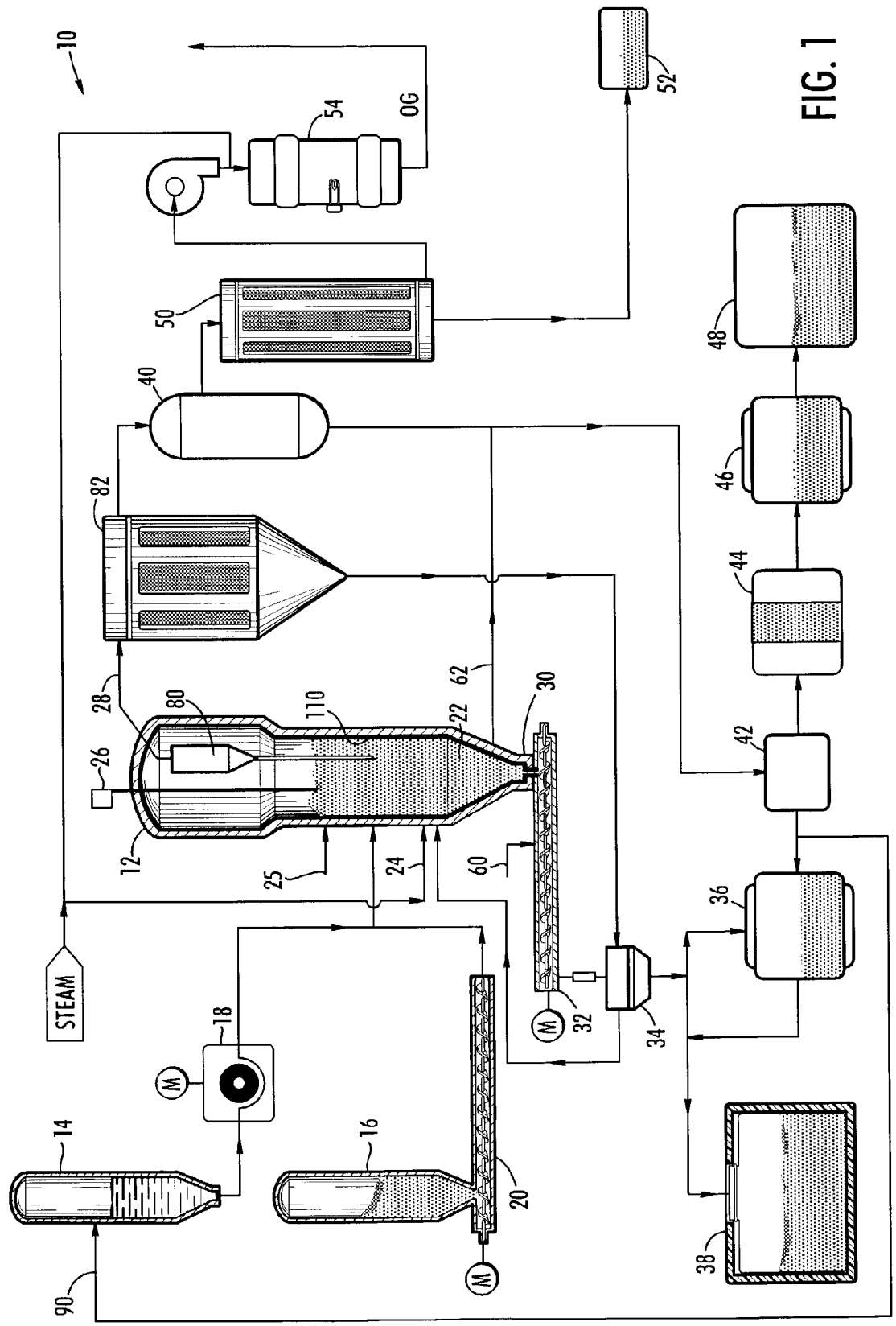
FIG. 1 is a schematic illustration of a system for removing NOx from a waste stream or compound according to a preferred embodiment of the present invention.

Referring now to FIG. 1, there is shown a system according to a preferred embodiment of the present invention and generally indicated by reference number 10. System 10 includes a single reaction vessel 12. Waste feed, which may be comprised of liquid slurries and sludges 14 and/or solids 16, are fed into the reaction vessel 12. In the case of the liquid slurries and sludges 14, a pneumatic pump, peristaltic pump or progressive cavity 18 may be employed for delivery of the pumpable fluids to the reacting vessel 12. In the case of the solids 16, a screw auger 20 may be employed to deliver the solid waste stream into the reaction vessel 12.

Reaction vessel 12 is preferably made explosion resistant through the use of heavy walls. Further, reaction vessel 12 includes an internal metallic insert 110 to provide corrosion protection to the outer reaction vessel wall. Although other metals are contemplated, the insert 110 is preferably made of a metal alloy, and, most preferably of Hastalloy, 242, 556, or HR-160.

In reaction vessel 12, fluidized media 22 may include inert ceramic media, as well as co-reactants, carbonaceous materials, reductants, catalysts, product solids, such as sodium compound product, in addition to or in lieu of the inert media. Various combinations of these materials may be used in the reaction vessel 12. For example, fluidized media 22 can include carbonaceous materials with product solids that have been formed during the process. The fluidized media 22 may further include catalysts, such as cerium, platinum, and palladium compounds, in combination with product solids. These catalysts are useful in lowering the energy of activation required to reduce NOx to nitrogen. Fluidized media 22 may also include any combination of carbonaceous material, co-reactants, reductants, product solids, ceramic media, and catalysts. Most preferably, fluidizing media 22 includes a combination of carbonaceous materials, catalysts, co-reactants, reductants, and product solids.

The use of inert bed material is a feature of the present invention and is preferred for the start-up of the process. Inert ceramic media such as silica, mullite, corundum, or alumina may serve as a heat sink. Preferably, amorphous alumina beads at least 200 and preferably up to 1000 microns in diameter are used, however beads up to 5,000 microns in diameter can be utilized. Such size beads do not easily elutriate out of the vessel and therefore minimize carryover. Another advantage of the amorphous alumina is that it will not form eutectic salt/glasses that can form harmful agglomerates that affect reactor efficiency as when common silica sand is utilized. The amorphous alumina is also exceptionally strong and hard and resists attrition due to reaction bed friction and impact.

Another feature of the present invention is the use of carbonaceous materials that act as both a reducing agent and a heat source. The addition of charcoal or carbonaceous solids to the bed in sizes ranging up to 0.5 inches in diameter is unique to the preferred embodiment. The large particles of carbon maintain a constant inventory of carbon that is not possible with typical fine sugars, organic powders or liquid chemicals previously used to facilitate nitrate reduction. The presence of larger carbon solids together with addition of soluble carbon in the form of formic acid, sugars, etc. provides superior nitrate reductions. The presence of carbon compounds in the bed will produce highly reducing CO and $H_2$ in the bed via steam reformation. The presence of carbon, CO, and $H_2$ in the bed also serves to reduce certain metal reductants, such as Fe, Ni, and Co, that function as strong reducing agents for conversion of NOx to $N_2$.

In order to evaporate water present in the waste feeds and to serve as a heat source, charcoal, sugar and/or other carbonaceous materials are added to or included in reaction vessel 12. Optionally, other reductants or catalysts such as iron or nickel oxalates, oxides, or nitrates may be used. Reaction vessel 12 bed materials can be modified to include these, or other metals, in order to further improve the denitration process. For example, the addition of 5 to 10% iron oxide to the reaction bed medium can improve NOx reduction by more than two-fold, and, often, by ten-fold. These metal catalysts/reductants are further desirable for their ability to be regenerated in the reaction vessel 12. For example, carbonaceous reductants, CO and $H_2$ can reduce $Fe_2O_3$ and $Fe_3O_4$ to FeO and/or Fe. The FeO or Fe then can serve as a very effective reducing agent to convert NOx to nitrogen gas. Further, the use of chemical reduction reactants is advantageous to the present invention because they are exothermic and can provide energy to the process. Typical chemical reducing agents include Fe, Ni, Cu, Co, and similar metals and metal oxides.

The denitration process is further optimized and improved through the addition of certain co-reactants or additives such as lime, to the reaction vessel 12. As previously stated, the addition of co-reactants such as lime, clay, magnesia, aluminum compounds, phosphate compounds, and silica compounds, to form higher melting point solid products, as well as synthetic naturally occurring minerals that are preferably water-insoluble is a particular feature of the present invention. The formation of higher melting point compounds helps to prevent agglomeration in the reaction vessel. Another problem typically faced is that water-soluble product compounds that also contain radioactive isotopes will most likely require further stabilization such as grouting, solidification, or vitrification, prior to disposal to prevent water dissolution of the buried product into the ground water. Accordingly, the formation of water-insoluble minerals is both advantageous and desirable because they are more easily disposed of and processed. It is also desirable to select and produce a product that is non-hygroscopic. The term non-hygroscopic refers to compounds that do not form hydrates. Solids that form hydrates can swell over time and can rupture or damage the containers they are stored in.

In an effort to address these problems, the following products listed with their main elemental constituents for simplicity can be made in the present process through the addition of certain co-reactants: Nosean (Na—Al—Si—$SO_4$), Nepheline (Na—Al—Si), Fairchildite (K—Ca—$CO_3$), Natrofairchildite (Na—Ca—$CO_3$), Dawsonite (Na—Mg—$CO_3$), Eitelite (Na—Mg—$CO_3$), Shortite (Na—Ca—$CO_3$), Parantisite (Na—Ti—Si), Maricite (Na—Fe—$PO_4$), Buchwaldite (Na—Ca—$PO_4$), Bradleyite (Na—Mg—$PO_4$—$CO_3$), Combeite (Na—Ca—Si), Olenite (Na—Al—$BO_3$—Si), Dravite (Na—Mg—Al—$BO_3$—Si), as well as other compounds for there are no common mineral names, such as Ca—Si, Na—$PO_4$, Na—Al—$PO_4$, Na—(Ca,Fe, Mg)—Si, Na—Al—PO$_4$, Na—Al, and Na—Mg—PO$_4$. Not only are many of these minerals desirable because they are water insoluble, but they can also help to further process such wastes as radioactive isotopes. For example, the product Nepheline forms a crystalline cage mineral structure that effectively binds bigger atoms, such as radionuclides and heavy metals.

In order to produce these alkaline earth compounds, the following co-reactants can be utilized with each co-reactant being added in the proportions needed to generate the desired higher melting point compound, and/or water insoluble compound. The addition of lime (CaO) or other Ca compound such as calcium carbonate or calcium nitrate provides the conversion of alkaline earths to a Ca rich final product such as Fairchildite. The carbonate is provided by any CO$_2$ that is present in the reaction vessel 12. The addition of magnesia (MgO) would produce minerals rich in magnesia, such as Eitelite. The addition of aluminum compounds such as kaolin clay and bentonite (alumina-silicates) can be used to produce Nepheline, Nosean, and other related sodium-alumina-silicates. The addition of other aluminum compounds such as aluminum nitrate, aluminum hydroxide, aluminum tri-hydrate (Al(OH)$_3$), or aluminum metal particles can be used to produce sodium aluminate. The addition of phosphate compounds to produce phosphate bonded ceramic media such as Maricite, Buchwaldite, Bradleyite or other PO$_4$ containing materials. The addition of silica compounds can be used to produce a sodium silicate product. The use of CO$_2$ to form a sodium carbonate produce is also utilized in the present invention. The CO$_2$ is generated in the bed by oxidation of carbonaceous reductants. Typical wastes that are fed into reaction vessel 12 can include portions of Ca, Mg, B, P, and other potential co-reactants.

The use of these co-reactants is further advantageous because of the behavior of sulfur and halogens, which may be present in the waste feed, in their presence. Co-reactants can bind S, Cl, and F into solid sodium or calcium product matrix, or other non-volatile stable products. The resultant off-gas typically contains <5% of incoming S, Cl, and F. This high retention of normal acid gases in the solid product allows scrubber solutions to be recycled to the reaction vessel 12 thereby eliminating secondary scrubber solution waste. For example, scrubber solution with S, Cl, and F based salts that are removed in the off-gas system scrubber can be recycled into the reaction vessel 12 as waste feed. A specific co-reactant that can be used is lime. The S and halogens can be directly bonded by the addition of lime (CaO) to form CaSO$_4$ (gypsum) as a stable product or the S as SO$_4$ can be bound into the crystalline structure of certain mineral forms such as Nepheline thereby converting it to Nosean.

Another feature of the present invention includes the use of gaseous reductants. The benefit of the use of gaseous reductants, such as hydrogen, ammonia, methane, carbon monoxide, and other hydrocarbon gases, is the minimization of carbon fines carryover with product. Generally, the sole use of gaseous reductants will result in lower conversions of NOx to N2 but may be beneficial if carbon carryover must be strictly limited.

Fluidizing gases are introduced into reaction vessel 12 via inlet 24. Steam is preferred to combustion gases as the fluidizing gas because it is more reactive, and generates CO and H$_2$ that are highly reducing by steam reformation of carbonaceous materials. However, the fluidizing gases can also include steam with oxygen, steam with reducing or fuel gases (including methane, carbon monoxide, and hydrogen), mixtures of steam, oxygen, reducing gases and/or fuel gases, steam with inert gas, inert gas with no oxygen, and steam with oxygen and with inert gas, air, carbon dioxide, and inert gas or gases. Gaseous NOx compounds can be co-injected with the fluidizing gases through inlet 24. Optionally, steam can be generated within reaction vessel 12 from the evaporation of water from the waste feed. Preferably, fluidizing gases can be recycled from the off-gas stream to save energy on the supply of fluidizing steam.

The heat generated by the oxidation of carbonaceous, metal, or gaseous reductants, and any auxiliary heat supply maintains the reaction vessel at the temperature required for reduction of the nitrogen oxides. Preferably, the reaction temperature is within a range of approximately 200° C. to 900° C. Excessively high heat can volatize sulfur-containing compounds, thereby separating them from the inorganic residues, volatize certain radionuclides and cause unwanted agglomerations in the reaction vessel.

As previously discussed, the fluidizing medium can be an inert gas, but is preferably a reforming gas and may have oxygen present. Most preferably, the medium is superheated steam. The fluidizing velocity can range from about 1.0 feet per second or higher depending on the bed media, preferably 2 to 4 feet per second (FPS) depending upon the size of the bed media. Significantly, the injection of the waste feed at higher or lower velocity and/or higher or lower atomizing gas flow enables the control of product particle size in the reaction vessel 12. Fluidizing gas distributors are designed to provide higher than normal gas/orifice velocities. Typical gas distributor velocities are 50 to 100 FPS, however, in the preferred embodiment gas velocities of >100 FPS are desired if ceramic bead media is utilized.

The high fluidizing gas jet speed has several advantages. High velocity fluidizing gas jets in a vertically oriented bed provides jet impingement on the media to help break down the softer, friable feed and to break-up agglomerates. Moreover, the media beads become self-cleaning due to abrasion in the high impact area around the fluidizing gas distributor. If product solids form the majority of the bed materials, a lower gas velocity is preferred.

Reactor vessel 12 is preferably operated in non-elutriating mode with co-reactants. Sodium and other low melting eutectics are almost instantly conerted to high melting point compounds thereby reducing eutectics to only low concentration (<1%). The low inventory of unconverted nitrates or sodium compounds greatly minimizes agglomeration potential. With most co-reactants and additives, the majority of the sodium product forms granules in the bed and are removed out of the bottom of the bed.

The nitrogen gas, steam, other fluidizing gases and fine particulates pass through a reactor gas outlet 28 and to the scrubber/evaporator 40. Any non-gaseous reformed residue or particulate collected in the scrubber/evaporator 40 is directed to residue separator 42 wherein the insoluble reformed residue are separated from the soluble salt solution. The reformed residue product is directed to the stabilization processor 36 or recycled to waste feed 14 while the salt solution is directed to salt separator 44 then to a salt dryer 46 and finally to a salt package 48. An optional filter 82 can be installed between the reactor gas outlet 28 and the scrubber/evaporator 40. Solids collected by the optional filter can be directed to product collector 34 or stabilization processor 36. The cooled and scrubbed off-gas and water vapors then pass to condenser 50. The resultant water is directed to the recycled water tank 52 while the off-gas moves to thermal converter 54. Off-gases (OG) from the thermal converter 54 are then monitored for compliance with the applicable environmental requirements prior to release.

Figure 2A:
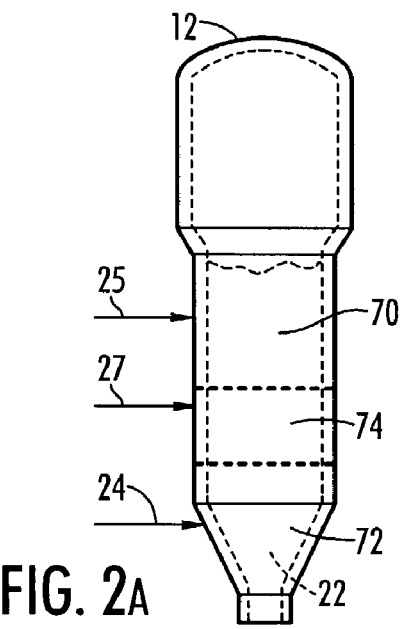
FIG. 2A is a front view of a reaction vessel having three zones that is used in a system for removing NOx from a waste stream or compound according to a preferred embodiment of the present invention.
Figure 2B:
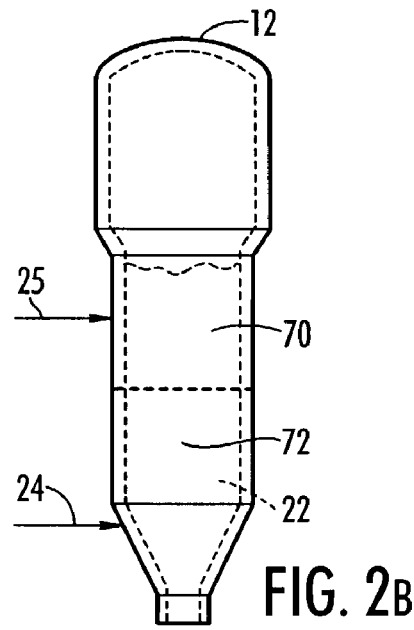
FIG. 2B is a front view of a reaction vessel having two zones that is used in a system for removing NOx from a waste stream or compound according to an alternative embodiment of the present invention.

As shown in FIGS. 2A and 2B, reaction vessel 12 of the preferred embodiment contains fluidized media 22, and is divided into at least two zones, including an upper zone 70 and a lower zone 72 (FIG. 2B). Preferably, reaction vessel 12 is divided into three zones (FIG. 2A), including upper zone 70, a middle zone 74, and lower zone 72. Although there need be no structural division between these zones to designate their dimensions, fluidized media 22 is divided into the zones through the introduction of various reducing and oxidizing agents into select areas of the reaction vessel 12 through plural inlets. In general, waste feed can be introduced at the top of upper zone 70 to provide particle size control, e.g., smaller particles can be made to grow larger as small particles are in higher proportion in the top of upper zone 70 than in the bottom of lower zone 72. As shown, the zones are preferably vertically oriented. However, the use of other orientations, such as a horizontal orientation, is contemplated in the present invention.

As discussed above, if the reactor vessel 12 includes three zones, it may be operated using one of four combinations. In combination 1, the lower zone 72 of reaction vessel 12 is operated under oxidizing conditions. To achieve this condition oxygen is mixed with the steam and introduced into the reactor vessel 12 via inlet 24 and may be optionally superheated. The pressure in the reactor vessel 12 is preferably about 13 to 15 psia. The reactor vessel 12 is preferably operated at 600 to 800 degrees centigrade. The fluidized media 22 depth is preferably between about 3 to 8 feet, expanded. The middle portion 74 of fluidized media 22 in reaction vessel 12 is operated under strongly reducing conditions via inlet 27, and the upper portion of the media bed is operated under oxidizing conditions by the addition of oxygen via inlet 25. Temperature is maintained within reactor vessel 12 by various techniques including the following: a heater 26, which may include any device adapted to provide heat such as an internal or external electrical heater or an internal or external combustion heater; by super heating fluidizing gases which provides auxiliary energy as needed, particularly during start-up; and by oxidation of carbonaceous materials. In combination 2, the lower zone 72 of the reaction vessel 12 may be operated under oxidizing conditions, and the middle and upper zones 74, 72, respectively, are operated under strongly reducing conditions. In combination 3, all three zones are operated under strongly reducing conditions. Finally, in combination 4, only the upper zone 70 of the reaction vessel 12 is operated under oxidizing conditions, and the lower and middle zones 72, 74, respectively are operated under strongly reducing conditions.

Under the conditions of combination 1 set forth above, the process treatment results in final gaseous effluent very low in NOx with no CO and $H_2$ output. The system generally requires low auxiliary energy addition. This system does not require the removal of NOx in the off gas scrubber system as NOx levels exiting the reaction vessel 12 are routinely <300 ppm. The addition of thermal converter 54 for CO and $CH_4$ oxidation is also not required.

In combination 2, the lower zone 72 of the media bed in reaction vessel 12 may be operated under oxidizing conditions, as discussed above, the middle portion and the upper portions of the media bed are operated under strongly reducing conditions. Combination 2 results in lowered NOx exiting reaction vessel 12 as compared to combination 1 but has increased levels of CO and $H_2$ and other trace volatile organics in the reaction vessel 12 output. Auxiliary energy is generally needed in the reaction vessel 12 and thermal converter 54 is required.

In combination 3, the reaction vessel 12 is operated only under strongly reducing conditions. Combination 3 results in lowered NOx, increased CO and $H_2$ and requires increased auxiliary energy and use of thermal converter 54.

In combination 4, only the upper zone 70 of the reactor vessel 12 media bed is operated under oxidizing conditions. Method 4 results in low NOx, no CO and $H_2$ output and reduced auxiliary energy. The thermal converter 54 is not required in the practice of this method. As previously described, temperature can be maintained and auxiliary energy can be provided by heating sources such as an internal or external electrical heater or combustion burner, and fluidizing gas superheater. Further, the oxidation of carbonaceous and gaseous reductants also produces energy within the reactor and can be used to maintain the temperature.

Notably, gaseous NOx can also be processed by direct introduction to reaction vessel 12 with other waste feeds. For example, high NOx off-gas from a vitrification melter or thermal denitration process can be used as both the waste stream and the fluidizing gas; however, steam is co-injected to keep the total gas flow through the reaction bed at greater than 20% steam and to provide uniform fluidizing gas velocities.

Figure 3A:
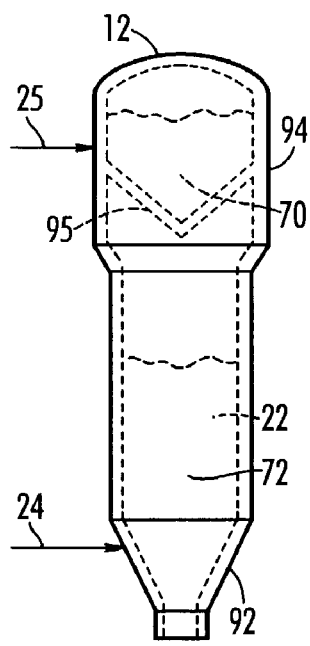
FIG. 3A is a front view of a reaction vessel having separate reaction beds that include two zones and that are used in a system for removing NOx from a waste stream or compound according to an alternative embodiment of the present invention.
Figure 3B:
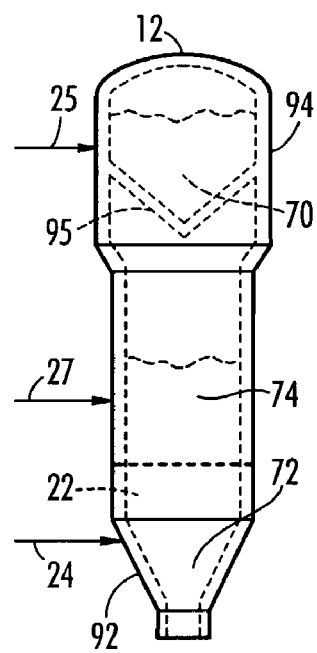
FIG. 3B is a front view of a reaction vessel having separate reaction beds that include three zones and that are used in a system for removing NOx from a waste stream or compound according to an alternative embodiment of the present invention.

As shown in FIGS. 3A and 3B, an alternative embodiment of the present invention includes reaction vessel 12 having a lower reaction bed 92 and a separate upper bed 94. Preferably, fluidized media 22 of the reaction beds is separated by a gas distributor 95. Similar to the preferred embodiment, the reaction vessel 12 includes at least two, and, preferably three zones with at least one zone operated under reducing conditions. The remaining zone or zones may be operated under either reducing or oxidizing conditions. Preferably, reaction beds 92, 94, are vertically oriented so that lower reaction bed 92 includes the lower zone 72 and, optionally, the middle zone 74, and the upper reaction bed 94 includes the upper zone 70. As with the preferred embodiment, the zones can be operated using the various combinations of oxidizing and reducing conditions as previously described.

The use of the separate upper reaction bed 94 is a particular feature of the present invention. Lower reaction bed 92 can contain high carbon content and be highly reducing for high NOx conversion and high energy generation, whereas upper reaction bed 94 can have no carbon content and be highly oxidizing. This arrangement will optimize the destruction via oxidation of reforming gases such as hydrogen and carbon monoxide, as well as volatile organic from the waste feed in upper reaction bed 94. Fine carbon carried from the lower reaction bed 92 can also be oxidized in upper reaction bed 94.

Figure 4A:
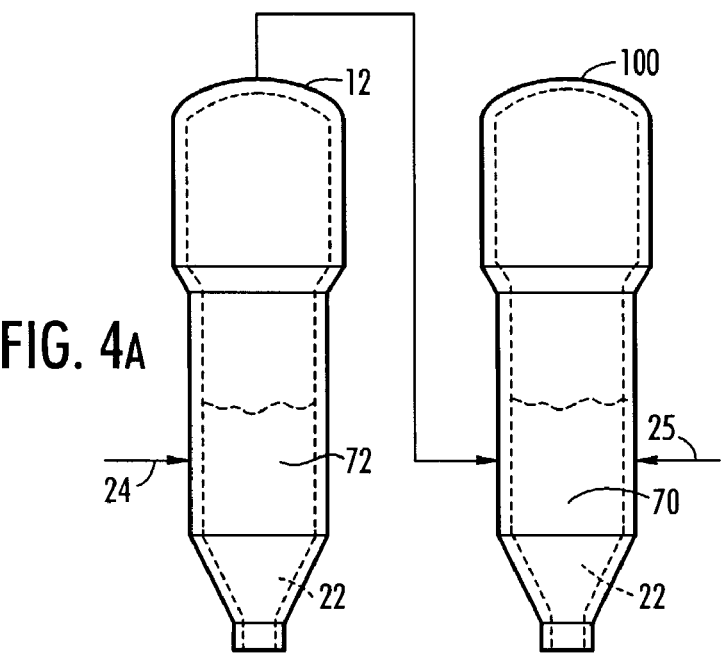
FIG. 4A is a front view of interconnected reaction vessels including two zones that are used in a system for removing NOx from a waste stream or compound according to an alternative embodiment of the present invention.
Figure 4B:
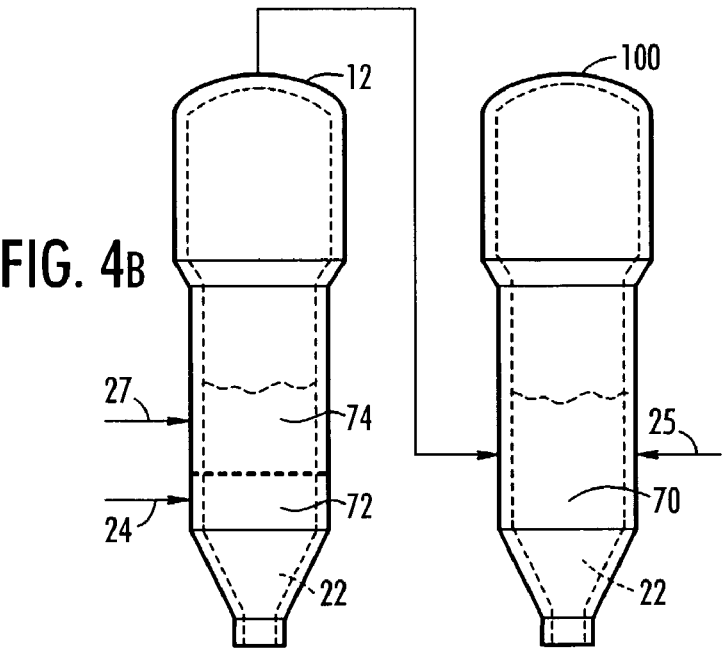
FIG. 4B is a front view of interconnected reaction vessels including three zones that are used in a system for removing NOx from a waste stream or compound according to an alternative embodiment of the present invention.

Alternatively, a second reaction vessel 100 that is connected to a first reaction vessel 12 can be utilized. As shown in FIGS. 4A and 4B, the two reaction vessels 12, 100, are interconnected and in fluid communication. Similar to the previously described embodiments, this alternative embodiment includes at least two, and, preferably, three zones with at least one zone operated under reducing conditions. The remaining zones may be operated under either reducing or oxidizing conditions. Preferably, the reaction vessels are oriented side by side. However, a vertical orientation of the reaction vessels is also contemplated by the present invention. The first reaction vessel 12 preferably contains a first zone 72, and, optionally, a second zone 74, and the second reaction vessel 100 includes a third zone 70.

When the NOx has been reduced to nitrogen, the nitrogen, steam and other off-gases leave the reaction vessel 12 via port 28. An optional filter 82 is provided downstream of reaction vessel 12 to remove fines elutriated from reaction vessel 12 off-gas. Preferably, filter 82 includes ceramic filter media. The fines are removed as the off-gas stream carrying the fines passes through filter 82. However, downstream filter 82 need not be included if solids are separated from scrubber solution in a scrubber 40. These separated solids from the scrubber 40 may be introduced to the waste feed through an inlet 90. Finally scrubber solution may also be recycled to the waste feed through inlet 90 for incorporation of the solids and salts into solid products. This alternative eliminates a secondary waste stream.

Fine solid products are also largely retained in the reaction vessel 12 by means of a solids separation device built into reaction vessel 12, such as a cyclone 80 (shown in FIG. 1), or a filter. Other small sized products, including entrained particulates also leave via port 28 and can thereafter be recycled to reaction vessel 12. Heavier solids and debris leave via port 30 and are carried away by screw auger 32 to collector 34. Auger 32 is preferably water or gas cooled. From collector 34 the larger solids and debris may be directed to stabilization processor 36 or to final product waste collector 38.

Preferably, collector 34 includes a metal separator, pneumatic classifier, and/or a screen separator for the recycling of metal reductants, catalysts and carbonaceous reductants. In the case that reaction vessel 12 contains only product particles and no alumina beads, a simple magnetic separator could separate iron-metal based reductants/catalysts from product for recycling of the reductants/catalysts to the reaction vessel 12.

The screw auger 32 can be optionally fitted with water washing capability. Water can be introduced into the bottom of screw auger 32 through inlet 60. Water dissolves any soluble sodium salt or other agglomerates that collect in the bottom of the reactor vessel 12. Salt water solution is removed from the bottom of reactor vessel 12 through screened outlet port 62. If desired, the salt water solution from outlet 62 can be collected in residue separator 42.

Testing has demonstrated the usefulness of metal reductant additions or catalysts to the bed to facilitate NOx reduction. Metal additives are not always required but are useful in maximizing NOx conversion to nitrogen gas. Typical metals that can be used include copper, cobalt, iron or nickel oxalate, oxides, or nitrates that can be co-injected with the waste feed in concentrations of less than 0.5% up to 20%. Alternatively, metals can be separately injected into the bed. The preferred bed will contain 5% to 10% metal reductants.

In the present method, heavy metals or inorganic cations can be converted into volatile fluoride or chloride compounds by the addition of appropriate fluorides and chlorides. As discussed above, the presence of heavy metals in the inorganic residues can render the final waste product hazardous, thereby requiring additional processing of the residue before disposal. For example, in a waste product that contains the relatively non-volatile CsO, chloride additives can convert the Cesium to very volatile $CsCl_2$, thereby separating the heavy metal or radioactive cation from the inorganic residue. By converting such hazardous metals or cations to the corresponding fluorides or chlorides and removing them from the inorganic residue by volatization, the present method avoids this problem that is traditionally associated with the reduction of nitrogen oxide-containing waste streams. Alternatively, the addition of certain co-reactants can retain chlorine, fluorine, sulfur, and volatile radionuclides such as Cs in the final product.

Further, the present method can use additives to tailor the solubility of the resulting inorganic residue or product. As discussed above, soluble components in the residue or product may form aqueous solutions that can result in contamination of the surroundings after disposal. An example of such tailoring of the solubility of the residue in the present method is the addition of aluminum nitrate to sodium-containing waste; in the correct proportions, this additive produces sodium-aluminum oxides that are soluble in water, whereas the addition of alumina-silicates, such as clay, can produce sodium-alumina-silicate, which is insoluble in water. By converting such soluble components into insoluble derivatives, the present method avoids this problem that is traditionally associated with the reduction of nitrogen oxide-containing waste streams.

It will be apparent to those skilled in the art of removing NOx from waste feeds that many modifications and substitutions can be made to the preferred embodiments described above without departing from the spirit and scope of the present invention, which is defined by the appended claims.

What is claimed is:

1. A method for removing nitrogen oxide groups from waste material, said method comprising:

providing a waste material comprising a nongaseous waste containing nitrogen oxide groups;

providing a reaction vessel containing a reaction bed and heating said reaction bed to an operating temperature, said reaction bed having a first zone and a second zone;

providing an agitating gas and said waste material in said reaction bed wherein said agitating gas provides a gas velocity that agitates said waste material, and wherein said reaction bed is fluidizable and said agitating gas provides a gas velocity that fluidizes said reaction bed;

providing a co-reactant in at least part of said reaction bed to form with at least one component of said waste material at least one mineral having a higher melting point than said waste component; and, operating at least one of said zones under reducing conditions so that said nitrogen oxide groups in said waste material are reduced at said operating temperature, thereby removing nitrogen oxide groups from said waste material and producing an inorganic residue and a gaseous effluent that together have substantially less nitrogen oxide groups than were present in said waste material.

2. The method as recited in claim 1, further comprising providing an oxidizing agent in said first bed zone, and wherein said second bed zone is operated under reducing conditions and said waste material is introduced into said second bed zone.

3. The method as recited in claim 1, further comprising providing an oxygen and steam mixture through a first inlet such that said first bed zone operates under oxidizing conditions, and wherein said second bed zone is operated under reducing conditions and said waste material is introduced into said second bed zone through a second inlet.

4. The method as recited in claim 1, wherein said reaction bed has a third zone, and wherein at least said second bed zone is operated under reducing conditions.

5. The method as recited in claim 4, wherein said second bed zone is above said first bed zone and said third bed zone is above said second bed zone.

6. The method as recited in claim 4, wherein said first and third bed zones operate under oxidizing conditions, and wherein said waste material is introduced into said second bed zone.

7. The method as recited in claim 4, wherein said third bed zone operates under oxidizing conditions, and wherein said waste material is introduced into said second bed zone.

8. The method as recited in claim 4, wherein said first bed zone operates under oxidizing conditions, and wherein said waste material is introduced into said second bed zone.

9. The method as recited in claim 4, wherein said second bed zone is between said first and third bed zones.

10. The method as recited in claim 4, further comprising providing an oxygen and steam mixture through a first inlet and oxygen through a third inlet such that said first bed zone and said third bed zone operate under oxidizing conditions, and wherein said waste material is introduced into said second bed zone through a second inlet.

11. The method as recited in claim 4, further comprising providing an oxygen and steam mixture through a first inlet such that said first bed zone operates under oxidizing conditions, and wherein said waste material is introduced into said second bed zone through a second inlet.

12. The method as recited in claim 1, wherein said co-reactant is provided in said reaction vessel to bind sulfur, chlorine, fluorine, alkali metals, heavy metals, radionuclides, or a combination thereof, in said waste material into a stable mineral structure.

13. The method as recited in claim 1, wherein said agitating gas comprises steam, and wherein said waste material contains water and at least a portion of said steam is provided by evaporating said water.

14. The method as recited in claim 1, wherein said agitating gas comprises steam, wherein solid carbon or another solid carbonaceous material is provided in said reaction bed, and wherein said solid carbonaceous material reacts with said steam to provide at least one reductant.

15. The method as recited in claim 14, wherein said carbonaceous material comprises a charcoal or a sugar.

16. The method as recited in claim 1, wherein said waste material contains metal ions, wherein a fluoride or chloride compound is provided in said reaction bed for converting said metal ions into a volatile metal fluoride or metal chloride, and wherein said operating temperature is above a volatilization temperature of said metal chloride or metal fluoride.

17. The method as recited in claim 16, wherein said operating temperature is below a volatilization temperature of at least one of said metal ions in said waste material.

18. The method as recited in claim 1, wherein said waste material contains a non-volatile sulfur compound, wherein an additive is introduced into said reaction vessel to convert said non-volatile sulfur compound into a volatile sulfur compound, and wherein said operating temperature is above a volatilization temperature of said volatile sulfur compound.

19. The method as recited in claim 1, wherein said operating temperature is greater than 200° C.

20. The method as recited in claim 1, wherein said operating temperature is between 200° C. and 900° C.

21. The method as recited in claim 1, wherein said agitating gas comprises steam, wherein said steam provides said bed with heat energy, and wherein said method further comprises providing auxiliary heat energy to said bed to supplement said steam energy.

22. The method as recited in claim 1, wherein exothermic reduction reactions are used to reduce said nitrogen oxide groups and provide heat energy to said bed.

23. The method as recited in claim 1, wherein said waste material contains organics.

24. The method as recited in claim 23, wherein heat energy is provided by introducing oxygen into said reaction bed to oxidize said organics.

25. The method as recited in claim 23, wherein said organics are oxidized to form at least one of CO, $CO_2$ and $H_2O$.

26. The method as recited in claim 1, wherein said fluidizing gas is introduce into said reaction vessel through a first inlet, and wherein said second zone is operated under reducing conditions and said waste material is introduced into said second zone through a second inlet.

27. The method as recited in claim 26, wherein said fluidizing gas comprises superheated steam, an oxidizing gas, a waste gas, an off-gas, a reducing gas, a syn gas, a combustion gas, an inert gas, air, or a mixture of steam and at least one of said other gases.

28. The method as recited in claim 26, wherein said fluidizing gas comprises steam and at least one other gas, the amount of said steam being sufficient to keep the total gas flow through the reaction bed at greater than 20% steam.

29. The method as recited in claim 26, wherein said fluidizing gas comprises steam, carbon monoxide, carbon dioxide, hydrogen, oxygen, methane, ammonia, a gaseous compound with a nitrogen oxide group, or a mixture of steam and at least one of said other gases.

30. The method as recited in claim 26, wherein at least a portion of said fluidizing gas is discharged from the reaction vessel after passing through said reaction bed, and at least a portion of said discharged gas is recycled to said reaction vessel.

31. The method as recited in claim 1, wherein product fines leave the reaction vessel along with at least a portion of said agitating gas, and at least a portion of said product fines are recycled to said reaction vessel.

32. The method as recited in claim 1, wherein at least one gaseous reductant is provided in said reaction vessel and said gaseous reductant comprises carbon monoxide, hydrogen, ammonia, syn gas, methane or another hydrocarbon gas, or a mixture of two or more of said gaseous reductants.

33. The method as recited in claim 1, wherein at least one additive is provided in said reaction vessel to enhance the removal of said nitrogen oxide groups.

34. The method as recited in claim 33, wherein said at least one additive is a carbonaceous material, a reductant, a catalyst, or a second co-reactant.

35. The method as recited in claim 33, wherein said additive comprises a solid carbonaceous material, a soluble carbonaceous material, carbon dioxide or other gaseous carbonaceous material, or two or more of said carbonaceous materials.

36. The method as recited in claim 35, wherein said carbonaceous material comprises a charcoal or a sugar.

37. The method as recited in claim 33, wherein said additive comprises elemental Fe, Mo, B, Ni, Cu, Co, Ce, Pt, Pd, an oxide or other compound of said elements, or two or more of said additives.

38. The method as recited in claim 33, wherein said additive is a copper, cobalt, iron or nickel oxalate, oxide or nitrate, or two or more of said oxalates, oxides or nitrates.

39. The method as recited in claim 38, wherein the amount of said additive provided in said reaction vessel is about 5 to 20% of the reaction bed medium.

40. The method as recited in claim 1, wherein said co-reactant is a calcium compound, a magnesium compound, an aluminum compound, a silicon compound, a phosphate compound, a kaolin or other clay, a bentonite, an alumina-silica compound, or two or more of said co-reactants.

41. The method as recited in claim 1, wherein said co-reactant forms a higher melting point salt or a water-insoluble compound with an element of a compound in said waste material.

42. The method as recited in claim 41, wherein said waste material contains a compound of an alkaline earth element, and wherein said co-reactant is a compound of aluminum or phosphorous that forms a high melting point salt with said alkaline earth element.

43. The method as recited in claim 41, wherein said waste material contains a water soluble compound of sodium, and wherein said co-reactant is an alumina-silica compound that forms a water insoluble compound with said sodium.

44. The method as recited in claim 1, wherein said waste material contains an acid gas, and wherein said co-reactant is provided in said reaction bed for converting said acid gas into solids.

45. The method as recited in claim 1, wherein at least one oxidant is provided in one of the zones of said reaction bed.

46. The method as recited in claim 45, wherein said oxidant comprises oxygen or hydrogen peroxide.

47. The method as recited in claim 1, wherein said reaction bed comprises particles of inert material.

48. The method as recited in claim 1, wherein said reaction bed comprises inert beads.

49. The method as recited in claim 48, wherein said inert beads comprise amorphous alumina beads.

50. The method as recited in claim 48, wherein said inert beads have a diameter of at least about 300 microns.

51. The method as recited in claim 48, wherein said inert beads have a diameter of approximately 2000 microns.

52. The method as recited in claim 1, wherein said agitating gas provides an average reaction bed gas velocity of at least 2.0 feet per second.

53. The method as recited in claim 1 further comprising agitating said waste material in said reaction bed with superheated steam to speed reduction of said nitrogen oxide groups.

54. The method as recited in claim 1 further comprising using a gas distributor for said agitating gas wherein an orifice velocity of said gas distributor is sufficient to facilitate agglomeration break-up and self-cleaning of said reaction bed.

55. The method as recited in claim 54, wherein said orifice velocity is greater than 100 feet per second.

56. The method as recited in claim 1, wherein said waste material comprises an off-gas containing nitrogen oxides from a vitrification process or a thermal denitration process.

57. The method as recited in claim 1, wherein a portion of said reaction vessel contains solids larger than solids in another portion of said vessel, wherein said larger solids are washed to dissolve soluble salts and agglomerates, and wherein said larger solids are removed from said reaction vessel before or after said washing step.

58. The method as recited in claim 1, wherein said nitrogen oxide waste material includes a solids feed, a liquid feed, a slurry feed of solids in liquid, or two or more of said nongaseous feeds.

59. The method as recited in claim 1, wherein said second zone is operated under reducing conditions and said nitrogen oxide waste material is introduced into said second zone.

60. The method as recited in claim 59, further comprising providing an oxidizing agent in said first bed zone.

61. The method as recited in claim 1, wherein said reaction bed comprises at least one fluidized medium.

62. The method as recited in claim 61, wherein said at least one fluidized medium comprises lime, magnesia, alumina, silica, mullite, albite, or mixtures of two or more of said mediums.

63. The method as recited in claim 61, wherein said at least one fluidized medium comprises inert solids, carbonaceous solids, product solids, catalyst solids, and reductant solids, or two or more of said solids.

64. The method as recited in claim 1, further comprising the step of providing auxiliary energy to said reaction vessel by a heater.

65. The method as recited in claim 64, wherein said heater is an electrical heater, a combustion heater, or a fluidizing gas heater.

66. The method as recited in claim 1, wherein means of solids separation is provided within said reaction vessel, and wherein said method further comprises using said separation means to separate entrained solids from said agitating gas after it leaves said reaction bed.

67. The method as recited in claim 1, wherein said reaction vessel contains a lower reaction bed providing said first and second zones and an upper reaction bed providing a third zone, and wherein at least one of said first and second zones is operated under reducing conditions.

68. The method as recited in claim 67, wherein said upper reaction bed is separated from said lower reaction bed by a gas distributor that redistributes agitating gas flowing from said lower reaction bed to said upper reaction bed.

69. The method as recited in claim 67, wherein at least a portion of said lower reaction bed contains a reductant.

70. The method as recited in claim 67, wherein said second zone is operated under reducing conditions and said nitrogen oxide waste material is introduced into said second zone.

71. The method as recited in claim 70, wherein said first zone and said third zone operate under oxidizing conditions.

72. The method as recited in claim 1, wherein said reaction vessel is a first reaction vessel in fluid communication with a second reaction vessel having a second reaction bed providing a third zone, wherein said second reaction bed is heated to an operating temperature, and wherein said nitrogen oxide waste material is introduced into said first reaction vessel.

73. The method as recited in claim 72, wherein at least a portion of the reaction bed of said first vessel contains a reductant.

74. The method as recited in claim 72, wherein said second zone is operated under reducing conditions and said nitrogen oxide waste material is introduced into said second zone.

75. The method as recited in claim 74, wherein oxygen is introduced into said first zone and said third zone such that said first zone and said third zone operate under oxidizing conditions.

76. A method for removing nitrogen oxide groups from a waste material containing such groups, said method comprising steps of:
providing a waste material comprising a nongaseous waste containing nitrogen oxide groups;
providing a reaction vessel containing a lower reaction bed and an upper reaction bed, said lower bed having at least one zone and said upper reaction bed having another zone;

heating each of said reaction beds to an operating temperature;

agitating said lower and upper reaction beds with an agitating gas, said lower reaction bed being fluidizable and said agitating gas providing a gas velocity that fluidizes said lower reaction bed;

providing said nitrogen oxide waste material and a co-reactant in at least part of said lower reaction bed to form with at least one component of said waste material at least one mineral having a higher melting point than said waste component; and, operating at least said lower bed zone under reducing conditions so that substantially all of said nitrogen oxide groups in said waste material are reduced, thereby eliminating substantially all said nitrogen oxide groups in said waste material and leaving an inorganic residue of decreased concentration in said nitrogen oxide groups and a gaseous effluent of decreased concentration in said nitrogen oxide groups.

77. The method as recited in claim 76, wherein said upper reaction bed is separated from said lower reaction bed by a gas distributor that redistributes agitating gas flowing from said lower reaction bed to said upper reaction bed.

78. The method as recited in claim 76, wherein at least a portion of said lower reaction bed contains a reductant.

79. The method as recited in claim 76, wherein said lower reaction bed includes a first zone and a second zone, and wherein said upper reaction bed zone is a third zone.

80. The method as recited in claim 69, wherein said second zone is operated under reducing conditions and said waste material is introduced into said second zone.

81. The method as recited in claim 80, wherein said first zone and said third zone operate under oxidizing conditions.

82. The method as recited in claim 80, wherein said first zone operates under oxidizing conditions.

83. The method as recited in claim 80, wherein said third zone operates under oxidizing conditions.

84. A method for removing nitrogen oxide groups from a waste material containing such groups, said method comprising steps of:

providing a waste material comprising a nongaseous waste containing nitrogen oxide groups;

providing a first reaction vessel in fluid communication with a second reaction vessel, said first vessel containing a reaction bed having at least one zone and said second vessel containing a reaction bed having another zone;

heating each of said reaction beds to an operating temperature;

agitating each of said reaction beds with an agitating gas, the bed of said first reaction vessel being fluidizable and said agitating gas providing a gas velocity that fluidizes the bed of said first reaction vessel;

providing said nitrogen oxide waste material and a co-reactant in at least part of the reaction bed of said first reaction vessel to form with at least one component of said waste material at least one mineral having a higher melting point than said waste component; and, operating at least said zone of said first reaction vessel under reducing conditions so that substantially all of said nitrogen oxide groups in said waste material are reduced, thereby eliminating substantially all said nitrogen oxide groups in said waste material and leaving an inorganic residue of decreased concentration in said nitrogen oxide groups and a gaseous effluent of decreased concentration in said nitrogen oxide groups.

85. The method as recited in claim 84, wherein at least a portion of the reaction bed of said first reaction vessel contains a reductant.

86. The method as recited in claim 84, wherein the bed of said first reaction vessel includes a first zone and a second zone, and wherein said zone of the bed in said second reaction vessel is a third zone.

87. The method as recited in claim 86, wherein said second zone is operated under reducing conditions and said waste material is introduced into said second zone.

88. The method as recited in claim 87, wherein said first zone and said third zone operate under oxidizing conditions.

89. The method as recited in claim 87, wherein said first zone operates under oxidizing conditions.

90. The method as recited in claim 87, wherein said third zone operates under oxidizing conditions.

* * * * *